United States Patent Office 3,360,519
Patented Dec. 26, 1967

3,360,519
PROCESS FOR THE PREPARATION OF 3-CYCLO-HEXYL-5,6-TRIMETHYLENEURACIL
John C. Watts, Wilmington, Del., assignor to E. I. du Pont de Nemours and Company, Wilmington, Del., a corporation of Delaware
No Drawing. Filed Sept. 23, 1964, Ser. No. 398,748
2 Claims. (Cl. 260—260)

This invention relates to a process for the preparation of 3-cyclohexyl-5,6-trimethyleneuracil.

As disclosed in copending application SN 232,311 now Patent No. 3,235,360, assigned to our assignee, 3-cyclohexyl-5,6-trimethyleneuracil is a herbicidally active compound, and can be readily formulated with suitable inert carriers to give compositions which have outstanding usefulness in controlling undesired vegetation.

Although methods are known for the preparation of this compound (e.g. Senda and Fugimura, C.A., 59, 642, 1963), much incentive and need remains for an improved process for its more economical manufacture.

The present invention offers an improved process for the manufacture of 3-cyclohexyl-5,6-trimethyleneuracil from a dialkyl adipate whereby substantially higher yields of said product are obtained. As additional advantages, the reaction time is shortened, cheaper raw materials are utilized, and a greatly reduced reaction volume per unit of product produced is obtained.

Briefly stated, the process of the present invention involves the ring closure of an adipate with a suitable agent such as sodium or methanolic sodium methoxide; and subsequent reaction of the acidified reaction mixture, in turn, with cyclohexylurea, a strong base, and dilute acid.

The multi-step reaction scheme of the process of the invention is particularly characterized in that only the final product is isolated. Surprisingly, it is found that this feature of the process of the invention leads to yields in excess of 80% of 3-cyclohexyl-5,6-trimethyleneuracil based on the adipate diester employed in the reaction. It is important, therefore, that the total dialkyl adipate ring closure reaction mixture from the first step of the process be employed in subsequent reaction steps of the process. Thus, the overall reaction can be conveniently carried out in one vessel.

With respect to the first step of the process, the dialkyl adipate reactant is preferably dimethyl adipate, although diethyl adipate is equally satisfactory. Obviously, mixtures of dimethyl adipate and diethyl adipate and/or mixed methyl ethyl adipates may also be used. Other dialkyl adipates, while suitable, are considerably more expensive and are not preferred. The agent used to cause ring closure of the dialkyl adipate is preferably sodium methoxide although other alkali metal alkoxides may be used. As will be appreciated by those skilled in the art, the reaction yields alcohol so the alkoxide may be formed in situ by merely adding the equivalent amount of alkali metal, preferably sodium. The reaction is facilitated if it is carried out in the presence of a solvent medium. Suitable mediums are inert aromatic or aliphatic solvents such as xylene, toluene, benzene, cyclohexane, hexane, heptane, or octane; or lower alcohol solvents, i.e., alcohols containing 1–4 carbon atoms.

The most preferred system for this first step of the process of the invention is dimethyl adipate, sodium methoxide, and methanol. It is found that this system provides the highly desirable advantage of conducting this step of the reaction in much less time and with a greatly reduced reaction volume per unit of reaction mixture than possible by prior art techniques. The mixture of the dialkyl adipate and sodium alkoxide in approximately equimolar amounts is heated together with the desired solvent under reflux for a period of about 1 to 3 hours. If the solvent is a lower alcohol, it is then distilled out and replaced with an inert solvent such as xylene. If an inert solvent is used initially, the alcohol formed from the reaction is then removed by distillation. The resulting reaction mixture is then cooled to about ambient temperature, and acidified with a non-aqueous acid, preferably sulfuric, until the reaction mixture is distinctly acid.

Cyclohexylurea is then added in a mole ratio of about 1 mole of cyclohexylurea for each mole of dialkyl adipate originally charged to the reaction. The reaction mass is then heated in the range of 70 to 90° C. until approximately the theoretical amount of water is collected by distillation. The pressure should be adjusted during heating so that the reaction mass boils in the desired temperature range. The time generally will run between 2 and 5 hours, but the actual time will, of course, depend upon many variables such as the temperature, pressure, particular reactants and the rate at which solvent is recycled in a manner as will be obvious to one skilled in the art. As the evolution of water substantially ceases, a distinct red coloration develops in the reaction mass.

A strong base is then added to the reaction mass in a mole ratio of about 1 to 1.5 moles of the base for each mole of dialkyl adipate originally charged to the reaction. The base employed is preferably sodium methoxide although other alkali metal alkoxides may be used. Other strong bases such as sodium hydroxide can also be used, but are less preferred. The mixture formed from the addition of the base is then heated at a temperature in the range of from 60 to 80° C. for about 1 to 3 hours during which time the uracil salt precipitates and alcohol is distilled off. This uracil salt can be used directly in formulations for herbicidal applications and, of course, where this is desired the uracil salt may be removed at this stage as the product of the process of the invention.

If the free uracil is desired, the reaction is diluted with water. A three-phase system forms. The organic solvent can be removed by standard procedures such as steam distillation, and the aqueous suspension of the uracil salt is then neutralized with any acid stronger than the uracil is satisfactory for this purpose with sulfuric and hydrochloric acids being preferred. The free uracil precipitates, and may be readily separated by filtration or any other suitable means.

A further understanding of the invention will be gained from the following working example which illustrates a preferred mode of executing the process of the invention.

*Example*

A mixture of 261.3 parts by weight (1.5 moles) of dimethyl adipate and 307.5 parts by weight (1.65 moles) of 29% methanolic sodium methoxide is heated for one hour under reflux in a flask fitted with a stirrer, thermometer, and reflux condenser. Then the condenser is reconnected to permit distillate takeoff, and methanol is distilled. When precipitation of solids begins, xylene is added with stirring at a rate equal to the distillation rate. Distillation is continued until the head temperature reaches 95° C. Sufficient xylene is then added to give a total of 600 parts by weight, and distillation is continued at reduced pressure until the head temperature reaches 800 C. at 130 mm. Hg. Then the mixture is coled to and maintained at 20 to 30° C., while slowly adding 98% $H_2SO_4$ until the system is distinctly acidic (some buffering is observed at the neutral point). The endpoint of $H_2SO_4$ addition is determined by removing a small portion of the stirred mixture, adding an equal volume of water, shaking, and determining the pH of the aqueous phase. The pH should be 3–4, and the value should not change on continued stirring.

Approximately 93 parts by weight of acid is required. Then 1 part by weight of $H_2SO_4$ and 213.3 parts by weight (1.50 moles) of cyclohexylurea are added. The reaction vessel is fitted with a decantor, and the reaction mixture is heated with steam while slowly reducing the pressure of the system to 122 mm. Hg. Distillation is allowed to proceed at this pressure until the head temperature reaches 84° C., whereupon the xylene condensate is allowed to flow back to the reaction vessel while water is trapped and removed. The heat input is adjusted so that the pot xylene is recycled about 2.5 times per hour, and the reaction is allowed to proceed until water evolution ceases. This requires about 3 hours, whereupon a distinct red coloration develops. Then the system is returned to atmospheric condition, and 372 parts by weight (2.0 moles) of 29% methanolic sodium methoxide is added over 10 minutes. The system is heated by steam, and methanol is allowed to distill for one hour, during which time the sodium salt of 3-cyclohexyl-5,6-trimethyleneuracil precipitates. Then the xylene is removed by steam distillation to give an aqueous suspension of the sodium salt. Sufficient water is added to give 1300 parts by weight total. Then the mixture is acidified with 25% sulfuric acid at 40 to 50° C. After stirring for 1 hour at this temperature, the resulting precipitate of 3-cyclohexyl-5,6-trimethyleneuracil is removed by filtration, washed with water until the washings give a negative sulfate test with $BaCl_2$, and dried at 60° C. under reduced pressure to constant weight. The product weighs 308 parts by weight equivalent to an 87.8% yield and melts at 310 to 313° C. with slow decomposition.

Although the process of the present invention is described herein for the preparation of 3-cyclohexyl-5,6-trimethyleneuracil, it is believed also to be applicable to the preparation of various other 3-substituted-5,6-trimethyleneuracil compounds.

Since many different embodiments of the invention may be made without departing from the spitit and scope thereof, it is to be understood that the invention is not limited by the specific illustrations except to the extent defined in the following claims.

I claim:

1. A process for preparing 3-cyclohexyl-5,6-trimethyleneuracil which comprises the steps of:
    (a) heating a dialkyl adipate selected from the group consisting of dimethyl, diethyl, and methyl ethyl adipate with an equimolar amount of an agent selected from the group consisting of sodium and sodium alkoxide in the presence of a solvent to form a reaction mixture in which ring closure of said dialkyl adipate is effected;
    (b) converting said reaction mixture to an acidic condition by treatment with a non-aqueous acid;
    (c) heating the reaction mixture resulting from (b) with an amount of cyclohexylurea equivalent to about 1 mole of cyclohexylurea for each mole of dialkyl adipate charged to step (a) at a temperature of from 70 to 90° C. and under a pressure to distill off water of reaction, for a period of time to substantially drive off the theoretical amount of water of reaction;
    (d) heating the reaction mass resulting from step (c) with an amount of a strong base equivalent to 1.0 to 1.5 moles of said base for each mole of dialkyl adipate charged to step (a) at a temperature of from 60 to 80° C. for 1 to 3 hours to form a salt of 3-cyclohexyl-5,6-trimethyleneuracil;
    (e) treating the reaction mixture resulting from step (d) with an acid to convert said salt to 3-cyclohexyl-5,6-trimethyleneuracil; and
    (f) recovering said 3-cyclohexyl-5,6-trimethyleneuracil from the reaction mixture of step (e).

2. A process for preparing 3-cyclohexyl-5,6-trimethyleneuracil which comprises the steps of:
    (a) heating dimethyl adipate with an equimolar amount of sodium methoxide in the presence of methanol to form a reaction mixture in which ring closure of said dimethyl adipate is effected;
    (b) distilling off the methanol and replacing it with an inert solvent selected from the group consisting of benzene, toluene, xylene, and heptane;
    (c) converting said reaction mixture to an acidic condition by treatment with non-aqueous sulfuric acid;
    (d) heating the reaction mixture resulting from step (c) with an amount of cyclohexylurea equivalent to about 1 mole of cyclohexylurea for each mole of dimethyl adipate charged to step (a) at a temperature of from 70 to 90° C. and under a pressure to distill off water of reaction, for a period of time to substantially drive off the theoretical amount of water of reaction;
    (e) heating the reaction mass resulting from step (d) with an amount of sodium methoxide equivalent to 1.0 to 1.5 moles of sodium methoxide for each mole of dimethyl adipate charged to step (a) at a temperature of from 60 to 80° C. for 1 to 3 hours;
    (f) treating the reaction mixture resulting from step (e) with an aqueous solution of sulfuric acid to convert said salt to 3-cyclohexyl-5,6-trimethyleneuracil; and
    (g) recovering said 3-cyclohexyl-5,6-trimethyleneuracil from the reaction mixture of step (f).

No references cited.

NICHOLAS S. RIZZO, *Primary Examiner.*

F. MIKA, *Assistant Examiner.*